(12) United States Patent
Krantz et al.

(10) Patent No.: US 7,506,188 B2
(45) Date of Patent: Mar. 17, 2009

(54) METHOD AND APPARATUS FOR MANAGING POWER IN NETWORK INTERFACE MODULES

(75) Inventors: Anton W. Krantz, Kirkland, WA (US);
Abhishek Abhishek, Woodinville, WA (US); Arun Ayyagari, Seattle, WA (US); Jiandong Ruan, Sammamish, WA (US); Timothy M. Moore, Bellevue, WA (US); Avi R. Geiger, Seattle, WA (US); Warren Vincent Barkley, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 9 days.

(21) Appl. No.: 11/699,838

(22) Filed: Jan. 30, 2007

(65) Prior Publication Data

US 2007/0162773 A1    Jul. 12, 2007

Related U.S. Application Data

(60) Continuation of application No. 11/330,766, filed on Jan. 12, 2006, which is a division of application No. 10/355,412, filed on Jan. 31, 2003.

(51) Int. Cl.
*G06F 1/32* (2006.01)
(52) U.S. Cl. .................. 713/320; 713/300; 713/323; 713/324
(58) Field of Classification Search ............. 713/300, 713/320, 323, 324
See application file for complete search history.

(56) References Cited

U.S. PATENT DOCUMENTS

| 5,375,254 | A  | * | 12/1994 | Owen ..................... 455/525 |
|---|---|---|---|---|
| 6,292,508 | B1 | * | 9/2001 | Hong et al. ............... 375/134 |
| 6,549,517 | B1 | * | 4/2003 | Aweya et al. ............ 370/236.1 |
| 2001/0021650 | A1 | * | 9/2001 | Bilgic ..................... 455/418 |
| 2003/0117968 | A1 | * | 6/2003 | Motegi et al. ............ 370/311 |
| 2004/0120278 | A1 |  | 6/2004 | Krantz et al. |

* cited by examiner

*Primary Examiner*—Tse Chen
(74) *Attorney, Agent, or Firm*—Wolf, Greenfield & Sacks, P.C.

(57) ABSTRACT

A method and system for managing power consumption in a portable computing device having a network interface module is presented. A power management module receives inputs from other modules and determines when the network interface module is to be put in a doze state for a predetermined number of beacon intervals to conserve power consumption in the network interface module. The network interface module in a device that is associated with a network is put in the doze state after an event has occurred including when a scan has been performed, after a delayed sleep timer has expired, and after a beacon transmission has been completed and no traffic is buffered for the device. The delayed sleep time is set based on the estimated round trip time of a packet.

10 Claims, 7 Drawing Sheets

METHOD AND APPARATUS FOR MANAGING POWER IN NETWORK INTERFACE MODULES

RELATED APPLICATIONS

This application is a continuation of prior application Ser. No. 11/330,766, filed Jan. 12, 2006, entitled METHOD AND APPARATUS FOR MANAGING POWER IN NETWORK INTERFACE MODULES, which application is incorporated herein by reference.

FIELD OF THE INVENTION

This invention relates generally to portable computing devices and, more particularly, relates to power management in portable computing devices.

BACKGROUND OF THE INVENTION

With the development and deployment of wireless networking devices such as laptop computers, personal digital assistant devices, etc. and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network. They can log onto the network using a wireless protocol while running on battery power, thereby allowing even greater mobility However, while the concept of mobile computing on wireless networks is well accepted, the implementation of this concept has taken on many forms. That is, there now exist several different wireless protocol standards that are competing in the marketplace. These standards include 802.11b (also know as Wi-Fi), 802.11a (also know as Wi-Fi5), 802.11g, HomeRF, Bluetooth, Wireless 1394, HiperLAN2, UWB, ZigBee, etc. Each of these different standards has particular advantages and was and is being developed with particular applications and users in mind. One thing in common with these standards is the use of a network interface module, commonly implemented as a network interface card (NIC).

As mobile workers demand greater mobility, both inside the organization and when traveling, the mobile workers are limited by the lifetime of the battery powering the wireless device. The battery life is a major restriction on mobility. The wireless NIC is the third highest consumer of battery power in a laptop. In small form factor devices, the wireless NIC consumes an even larger percentage of battery power than in a laptop. Most of that energy is used for wireless data transmissions to keep the wireless NIC powered on even when the NIC is not engaged in data transmissions. Since the amount of power a battery provides is limited, how to minimize power consumption to extend the operation time of the device powered by the battery is an important issue for these devices.

One method that has been taken to reduce power consumption of the functions the wireless NIC performs is adjusting the period between performing scanning to determine which devices are in the range of the wireless networking device. For example, U.S. application Ser. No. 10/323,043, filed Dec. 18, 2002 and assigned to the assignee of this application teaches setting the time between scans using an exponential function based on the scanning history and scan results of the latest scan. However, while increasing the time between scans conserves power, more methods to conserve battery power are needed.

BRIEF SUMMARY OF THE INVENTION

The present invention provides a method and apparatus for managing power in a network interface module in a computing device. A power management module controls the power state of the network interface module based upon parameters received from other modules in the computing device. If the computing device is being powered from the limited energy power source such as a battery or fuel cell and the computing device is associated with an access point, the network interface module is operated in a power saving mode to conserve power draw from the limited energy power source. In one embodiment, the power saving mode is either a fast power save mode or a maximum power save mode. If the computing device is not associated with an access point and the network interface module is scanning or a scan has been requested, the network interface module is operated in a powered up state where the network interface module is fully powered. In one embodiment, when the network interface module is not associated with an access point and is not performing a scan or has completed a scan, the network interface module is put into a low power state (i.e., a doze state). If the computing device is not associated with an access point and the network interface module is scanning or a scan has been requested, the network interface module is set to a powered up state if the network interface module was in a doze state where the minimum amount of power for the network interface module to operate is used. If the computing device is being powered from a power line source (e.g., an ac power source, battery charger, etc.), the network interface module remains in a powered up state, where the network interface module is fully powered.

A user may set a preference via an interface to specify whether the user wants no power conservation (i.e., a constant awake mode), a mid range of power conservation (i.e., a fast power save mode), or a maximum mode of power conservation (i.e., a maximum power save mode). In addition to the user settable preference, an application can tag a packet to indicate a fast response is required and the power management module adjusts operation of the network interface module to operate in a constant awake mode or a fast power save mode.

In the fast power save mode, the power management module determines when the network interface module can enter a doze state and sends a notification to an access point that the network interface module is going to be set to the doze state. The power management module sets the network interface module to the doze state after the notification has been sent. Prior to a beacon interval ending, the network interface module is set to a powered up state (i.e., an on state) to receive a beacon for each beacon interval. If the beacon indicates that no packets are queued for the computing device at the access point or the peer computing device, the network interface module is put back into the doze state. If the beacon indicates that at least one packet is buffered for the computing device, the network interface module receives the packets that have been buffered and then is put in the doze state.

The step of determining when the network interface module can enter a doze state includes determining that a delayed sleep timer has expired, determining if a scan has been completed, determining if a beacon indicates that no traffic is queued for the computing device, and determining if the power source switches from the limited energy power source to the power line source.

In a maximum power save mode, the power management module puts the network interface module into a doze state for multiple beacon intervals (i.e., a listening interval). The power management module determines when the network interface module can enter a doze state and sends a notification to an access point that the network interface module is going to be set to the doze state. The power management module sets the network interface module to the doze state after the notification has been sent. Prior to the listening interval ending, the network interface module is set to an on state to receive a beacon. If the beacon indicates that no packets are queued for the computing device, the network interface module is put back into the doze state for a listening interval. If the beacon indicates that at least one packet is buffered for the computing device, the network interface module receives the packets that have been buffered and then is put into the doze state for the remainder of the listening interval.

The power management module has a power management backend module to determine when the network interface module is to be set to one of an on state and a doze state, a system state module in communication with the power management backend module to provide system state information including whether the device is being powered from the limited energy power source to the power management backend module, and an interface list module in communication with the power management backend module to provide interface state information of the network interface module to the power management backend module. The power management backend module determines when the network interface module is to be set to the on state, the doze state, and the off state using a state machine. The power management module determines that the network interface module is to be set to the doze state after a delayed sleep timer has expired, a scan has been completed, or a beacon indicates that no traffic is queued for the computing device when the network interface module is operating in a power save mode.

A delayed sleep time is used to improve network throughput for devices operating in a power save mode by waiting for a specified time after a packet is sent before setting the network interface module to a doze state. This allows an application to receive a response without having to wait for the next beacon interval or listening interval provided that the recipient sends a response within the delayed sleep time. A delay sleep timer is used to provide the timing function. The delay sleep timer is set after a packet is sent to an access point for distribution and the network interface module is set to the doze state after the delay sleep timer has timed out. The delay sleep timer is reset if another packet is being sent to the access point while the delay sleep timer is counting. The delay sleep time is determined for each packet and is based upon an estimated round trip time of the packet being sent.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
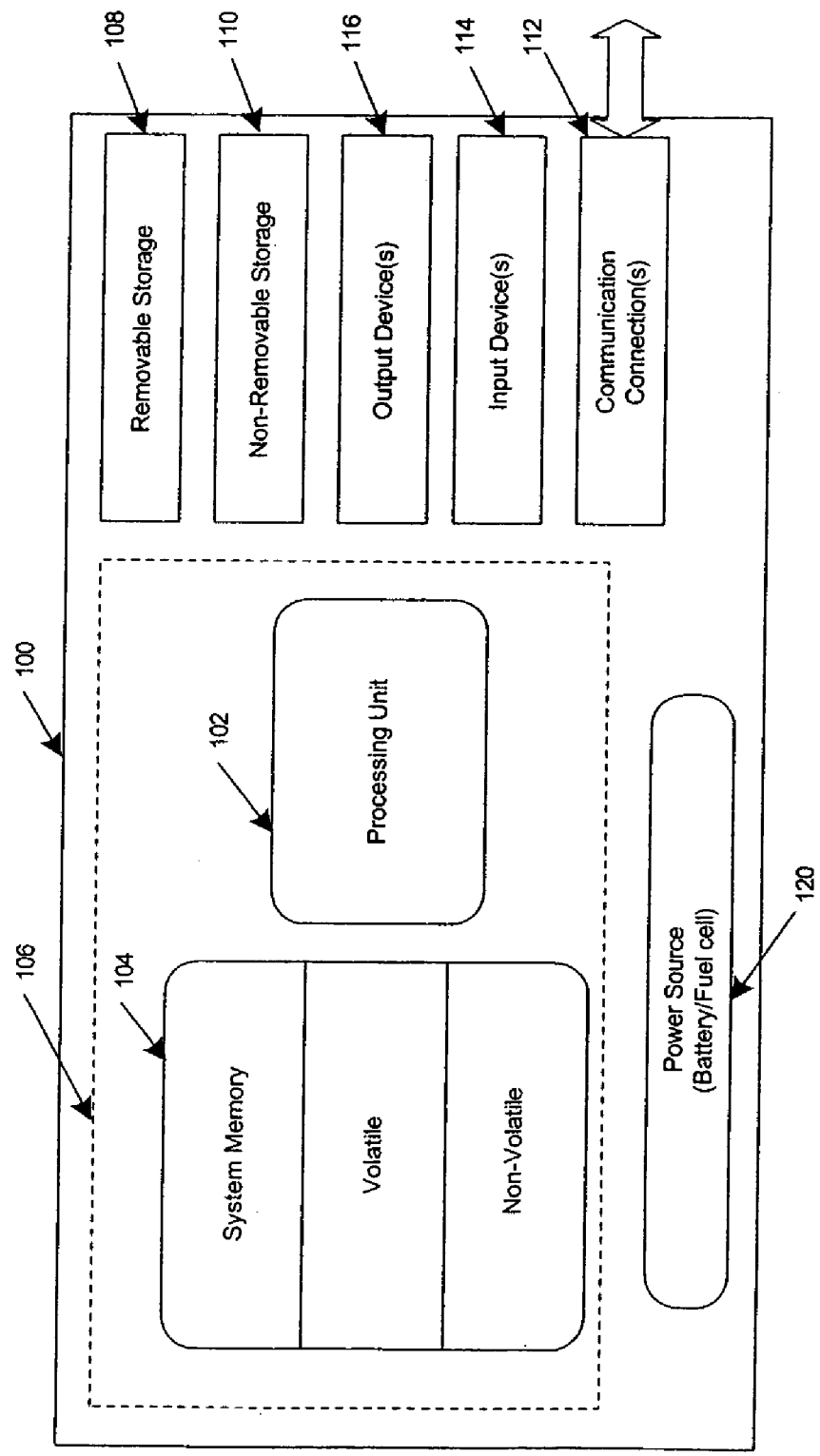
FIG. 1 is a block diagram generally illustrating the architecture of an exemplary computer device in which an embodiment of the invention may be implemented.

This invention operates in a computing device having a network interface module for accessing a network and a limited energy power source, such as a battery pack or the like, that has a limited amount of energy stored therein. Current network interface modules stay remain in a high power state (transmitting, receiving, or listening) longer than needed when not sending network traffic. This time is wasted power consumption, which reduces the duration of the battery pack. This leads to having to replace or recharge the battery pack more frequently. It is desirable to reduce the amount of time the network interface module is in a high-power state when not sending traffic or scanning. The invention provides a method to conserve battery power based upon a user's preferences. Prior to describing the invention in detail, an exemplary computing device in which the invention may be implemented is first described with reference to FIG. 1.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computing device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

Figure 2:
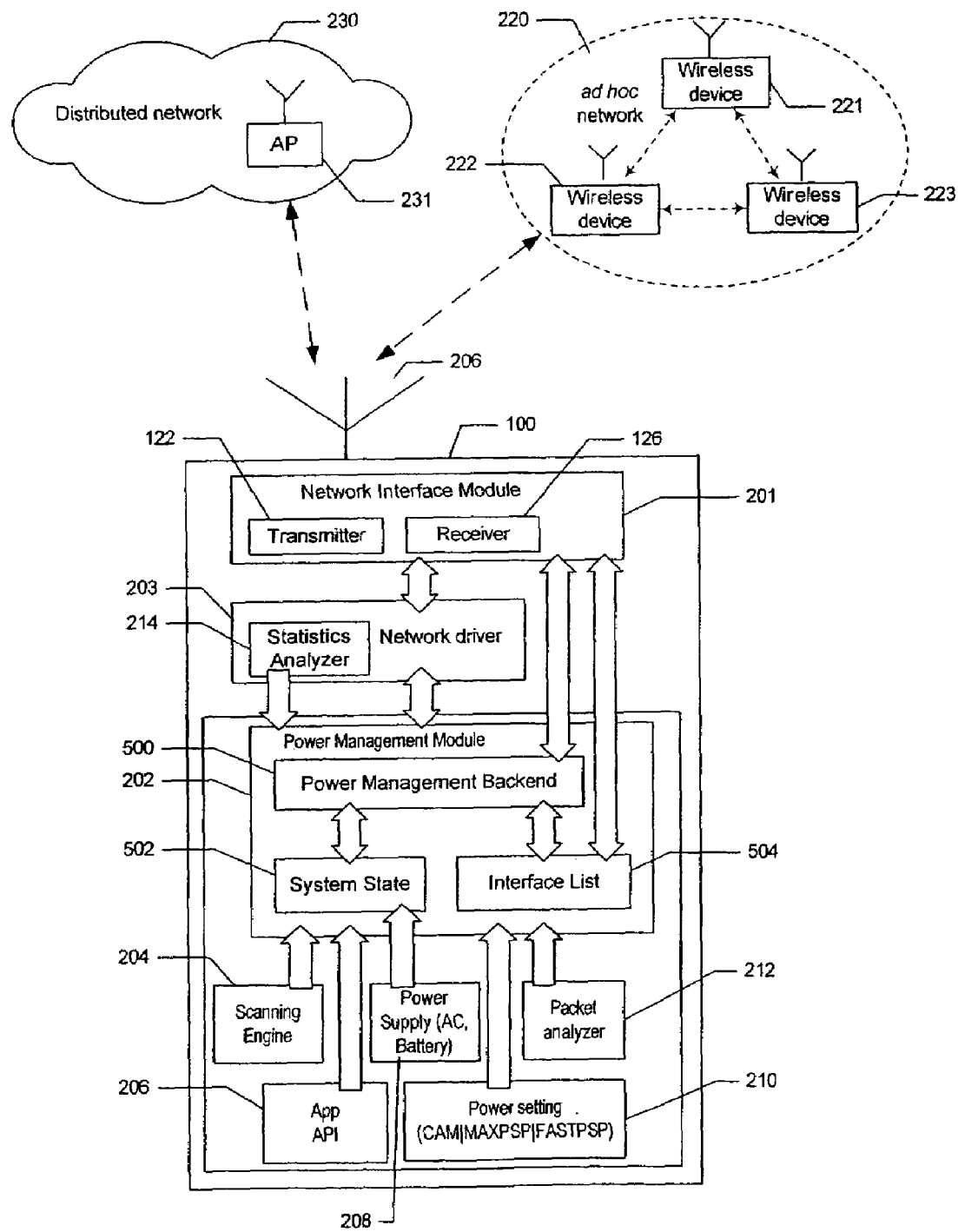
FIG. 2 is a schematic diagram illustrating an exemplary operation environment for a computing device that implements an embodiment of the power saving mechanism of the invention.

In keeping with the intended application of the invention, the device 100 is configured as a mobile device. To that end, the device 100 is provided with a portable limited energy power source 120, such as a battery pack, a fuel cell, or the like. The limited energy power source 120 provides power for computations and data transmissions by the device 100. As shown in FIG. 2, the computing device 100 further includes a network interface module 201 for wirelessly communicating with different types of wireless networks. The network interface module 201 in this implementation includes a transmitter 122, which is coupled to an antenna 206 for transmitting data wirelessly over a suitable frequency channel. A receiver 126 is also coupled to the antenna 206 for receiving communication packets wirelessly transmitted from the networks that the device is communicating with. The network interface module 201 and the antenna 206 are part of the communication connections 112 in FIG. 1. In one embodiment, the network interface module 201 employs wireless configuration service over the IEEE 802.11 wireless connections to ease network configuration, including infrastructure networks and ad hoc networks. An exemplary network interface module is PCM-CIA wireless card. It will be appreciated that the interface type and physical configuration of the network interface module is not critical to the invention. For instance, the interface type could be PCI or another type and the network interface module does not have to reside on a separate card. It may be included on the motherboard of the computer or even possibly built into the processor in the future.

Through the network interface module, the computing device 100 may communicate with different types of wireless networks. For instance, in the illustrated environment of FIG. 2, the computing device 100 may be a station connected wirelessly to an infrastructure network 230 through an access point 231 thereof. The computing device 100 may also be part of a peer-to-peer network 220, also referred to as an ad hoc network, that includes other computing devices, such as the computing devices 221, 222, and 223. Before connecting to either the access point 231 of the infrastructure network or the ad hoc network 220, the computing device 100 may be in a state of searching for devices that belong to the network by periodically scanning actively by sending probe requests and scanning for probe response signals transmitted by the access point or other devices. Alternatively, the computing device 100 may search passively by scanning for beacons transmitted by access points.

A network driver 203 controls the operation of the network interface module 201. The network driver 203 is either part of the operating system of the computing device 100 or a separate executable program running on the computing device 100. An exemplary network driver is the Network Driver Interface Specification (NDIS). The network driver 203 is in communication with a power management module 202, which dynamically directs the network interface module 201 to change power states as described herein. The power management module 202 is in communication with several components to obtain data used to determine which power state the network interface module 201 should be in. These components may include a scanning engine 204, applications through API (application programming interface) 206, power supply indicator 208, power setting 210, packet analyzer 212, and statistics analyzer 214.

The scanning engine 204 uses an interface to the power management module 202 to request that the network interface module 201 be put into a high power state when it needs to perform a scan. It will send a message to indicate that a scan has been completed to indicate that it does not need the network interface module 201 to remain in a high power state any longer. The scanning engine 204 adjusts the time between scans using an exponential function based upon scan history and scan results. Further details of the scanning engine 204 may be found in U.S. patent application Ser. No. 10/323,043, filed Dec. 18, 2002, hereby incorporated by reference in its entirety. Applications use API 206 to request the data that it transmits must be transmitted in a low or high power state. If the application has no preferences, it does not call the API 206.

The operating system of the device 100 or another module (not shown) determines if power is being supplied by the limited energy power source 120 or from an ac source. It uses power supply indicator 208 to communicate to the power management module 202 whether the device 100 is being supplied power by an ac source or from the limited energy power source 120. The user may specify the power setting it wants through power setting 210. These power settings are high, medium, and low. The high power setting corresponds to a constant awake mode, the low power setting corresponds to a maximum power saving mode, and the medium power setting corresponds to a fast power saving mode and these power settings are described herein. Packet analyzer 212 determines when the network interface module 202 may be put in the doze state. The packet analyzer 212 observes packets sent through the network interface module 202 to determine when a client is not sending traffic. When sufficient time has passed between sending data, the packet analyzer 212 informs the power management module that it can set the network interface module 202 to a doze state. Statistics analyzer 214 only works for network drivers that support it. The packet analyzer 212 queries the statistics analyzer 214 to determine statistics for the connection to determine if the power level should be adjusted. The statistics include received signal strength, transmitted fragment count, failed count, retry count, multiple retry count, frame duplicate count, RTS success count, RTS failure count, ACK failure count, FCS error count, and transmitted frame count.

The power management module 202 and components 204-214 may reside in the system memory 104, the removable storage 108 or the non-removable storage 110 in FIG. 1. While the power management module 202 and components are shown separately for clarity, it is recognized that the module 202 and some or all of the components may be part of the operating system or part of another module in the computing device 100.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the device of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. Additionally, an access point will be used to describe the operation of the invention. It is understood that the invention will work in the ad hoc mode with peers and in other systems that have components that behave like access points and peers. In the description that follows, the interaction between the network interface module and access point (e.g., messages and notifications) can also be implemented between a peer and the like.

The invention controls the power to the network interface module 201 to three primary levels. These levels are on state, doze state, and off state. While three levels are described, an arbitrary number of levels may be used depending on the operating system, capabilities of the network interface module and driver. In the doze state, the system is in an idle state where the network interface module 201 is powered to the minimal power level it needs to maintain itself but not send any traffic. The invention provides a method for the network interface module 201 to spend as much time in the doze state when the network interface module 201 is not sending or receiving traffic or scanning.

Figure 3:
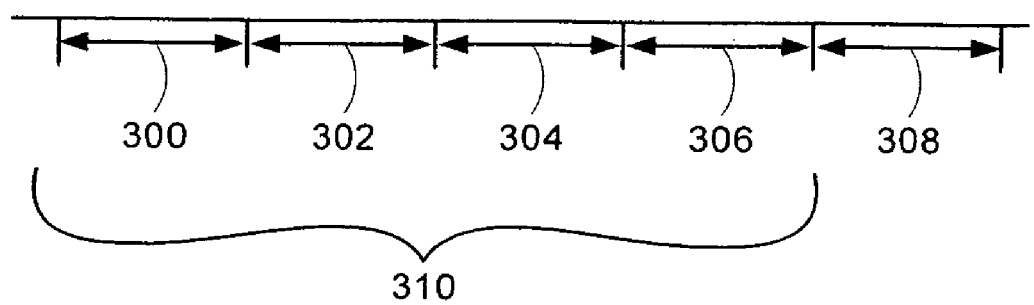
FIG. 3 is an illustration of how a listening interval relates to a beacon interval.

In the on state, there are three power levels. These power levels are constant awake mode (CAM), maximum power saving mode (Max PSP) and fast power saving mode (Fast PSP). In the CAM mode, the network interface module 201 is fully powered and no power saving is employed. Prior to defining Max PSP and Fast PSP, the relationship between beacon interval and listening interval shall be explained. Turning now to FIG. 3, in many wireless systems, an access point periodically broadcasts a beacon frame that contains the timing information and other information, including a traffic indication map (TIM). The stations that receive the beacon frame adopt the access point's timer value in a received beacon if the received time is later than the stations own timer. The period between broadcasts is known as a beacon interval. A typical beacon interval is 100 ms.

FIG. 3 illustrates beacon intervals 300, 302, 304, 306, 308. A listening interval is defined as a multiple of beacon intervals. In FIG. 3, listening interval 310 is four beacon intervals. Any number of beacon numbers may be used for a listening interval. Now that beacon interval and listening interval have been explained, Max PSP and Fast PSP will now be defined. In the Max PSP mode, the network interface module 201 is placed in the doze state when not receiving or sending traffic and only wakes up every listening interval. In the Fast PSP mode, the network interface module 201 is placed in the doze state when not receiving or sending traffic and wakes up every beacon interval. An access point periodically sends the TIM within a beacon to identify which devices using power saving mode have data frames waiting for them in the access point's buffer. The TIM identifies a station by an association ID that the access point assigned to the device 100 during the association process. In the off state, the network interface module 201 is turned off.

Figure 4:
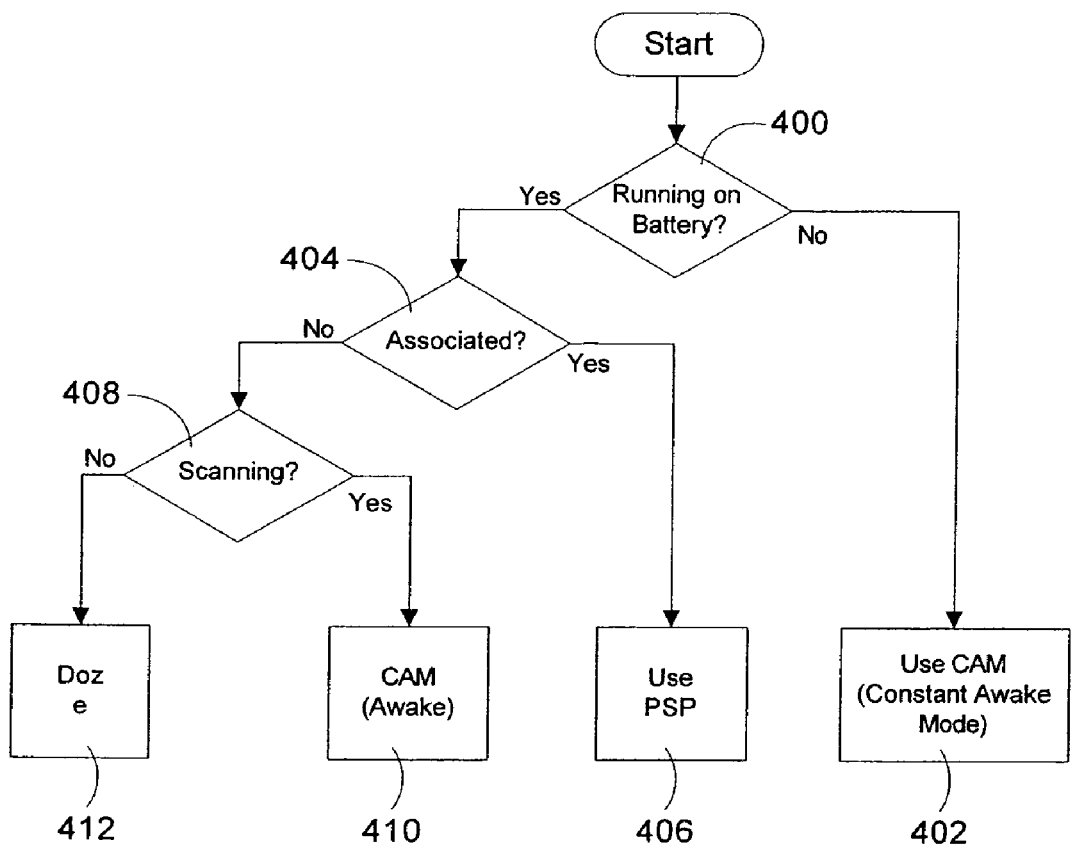
FIG. 4 is flowchart showing the steps for determining what power mode of operation the network interface module is set to in accordance with the teaching of the present invention.

Now that the states have been described, the overall operation of the power management module 202 shall be described. Turning now to FIG. 4, the power management module 202 determines if the device 100 is using power from limited energy power source 120 or from a power line source (step 400). If the device 100 is using power from a power line source, the power management module 202 sets the network interface module 201 to operate in the constant awake mode (step 402). It should be noted that if the device 100 is an energy star compliant device (or the like), the power management module 202 operates as if the device is running off the limited energy power source 120 to conserve energy. A user may force the device 100 to be in the constant awake mode through power setting 210.

If the device 100 is using power from a limited energy power source, the power management module 202 determines if the device 100 is associated with an access point (step 404). The power management module 202 operates the network interface module 201 in one of the power saving modes (i.e., Max PSP or Fast PSP) if the device 100 is associated with an access point (step 406). If the device 100 is not associated, the power management module 202 determines if the device 100 is in the scanning mode (step 408). The scanning engine 204 provides this information to the module 202. The power management module 202 operates the network interface module 201 in the constant awake mode if the device 100 is scanning (step 410). If the device 100 is not in the scanning mode, the power management module 202 puts the network interface module 201 in the doze mode (step 412).

When in one of the power savings modes, the power management module 202 receives information from the modules 204-214 and uses that information to set the power level of the network interface module 201. The packet analyzer settings from packet analyzer 212 take precedence over the scanning settings from scanning engine 204 or application settings received from the API 206. The rationale is that the packet analyzer determines the appropriate power level for the supported data transmission rate and if the card requires less than full power to achieve the data transmission rate, then power should be conserved. The exception is if neither the scanning engine 204 nor the application request high power and one of them requests low power, in which case the network interface module 201 can remain in low power state as there is no client requirement for it to be in a high power state. If none of the components provide input to the power management module 202, then the power setting will remain in its existing state.

When there is data to send, the network interface module 202 will be set to the continually awake mode to send data from an application. The packet analyzer 212 determines an expected round trip time that it would take to get traffic back from the last transmission. This time, called a delayed sleep time, is associated with each packet sent by the device 100. When a packet is sent, the power management module 202 sets a timer for the delayed sleep time. After the timer times out and no traffic has been received, the network interface module 202 will be set to the doze state to save power. If there is more traffic to send, the timer is reset. The delayed sleep time is dynamic because it is based on the round trip time. The network interface module could be transmitting packets from multiple sessions. Packet transmissions from different session would have different round trip transmission (RTT) delays. The delayed sleep time is a dynamic value based on the maximum of the RTTs for the packet transmissions from all sessions. For example, pending packet transmission from one session may have a RTT of under 10 msecs, while the other may have a RTT of 50 msecs, in this case the delayed sleep would be based on the maximum between the two cases (e.g., 50 msecs). Additionally, the RTT for a session may be different in situations where the packets are being sent to multiple locations. For example, a transmission that is being sent to Japan from the United States will have a longer delayed sleep time than a transmission being sent from the United States to another location within the United States. If the round trip time is longer than a beacon interval, the power management module determines if the network interface module can remain in the doze state for longer than the beacon interval based upon factors such as the risk of missing a return packet, the round trip time, etc. If the power management module determines that the network interface module cannot remain in the doze state for longer than a beacon interval, the power management module will set the network interface module to the powered up state to receive a beacon. Otherwise, the network interface module remains in the doze state until the delayed sleep timer expires.

The delayed sleep time improves network throughput for devices operating in a power save mode because it allows an application to receive a response without having to wait for the next beacon interval or listening interval provided that the recipient sends a response within the delayed sleep time. Additionally, an access point does not have to buffer the response, thereby conserving resources. Applications which are satisfied with this mode of operation do not need to call the API 206 and will not have any influence on the power setting chosen.

An application that specifically requires fast response will use the API 206 to tag packets accordingly. The power management module 202 will not be as aggressive in powering down the network interface module 201 to allow sufficient time for return traffic when an application has called the API 206. For example, the network interface module 201 may be put in the constant awake mode for several beacon intervals and/or the delayed sleep time could be increased. The invention protects the device 100 against an application constantly tagging packets to intentionally draw down the limited energy power source 120 with a timer function. If an application calls the API 206, the power management module 202 starts a timer. If the application (or any other application) does not send any more packets, the timer will time out after a multiple of the round-trip-time for the traffic has elapsed, allowing the power management module 202 to set the network interface module 201 to the doze state.

The power management module 202 communicates with the network interface module using object identifiers (e.g., OIDs). The OIDs are to set or query the power state of the network interface module 201 and to set or query the delayed sleep time for transmitted traffic. The power state OID is OID_802_11_Power_State and the delayed sleep OID is OID_802_11_Delayed_Sleep. Parameters for the OID_802_11_Power_State are a setting to switch the network interface module to the on state, a setting to switch the network interface module to the doze state, and a setting to switch the network interface module to the off state. The parameter for the OID_802_11_Delayed_Sleep is the delay sleep setting in milliseconds.

Figure 5:
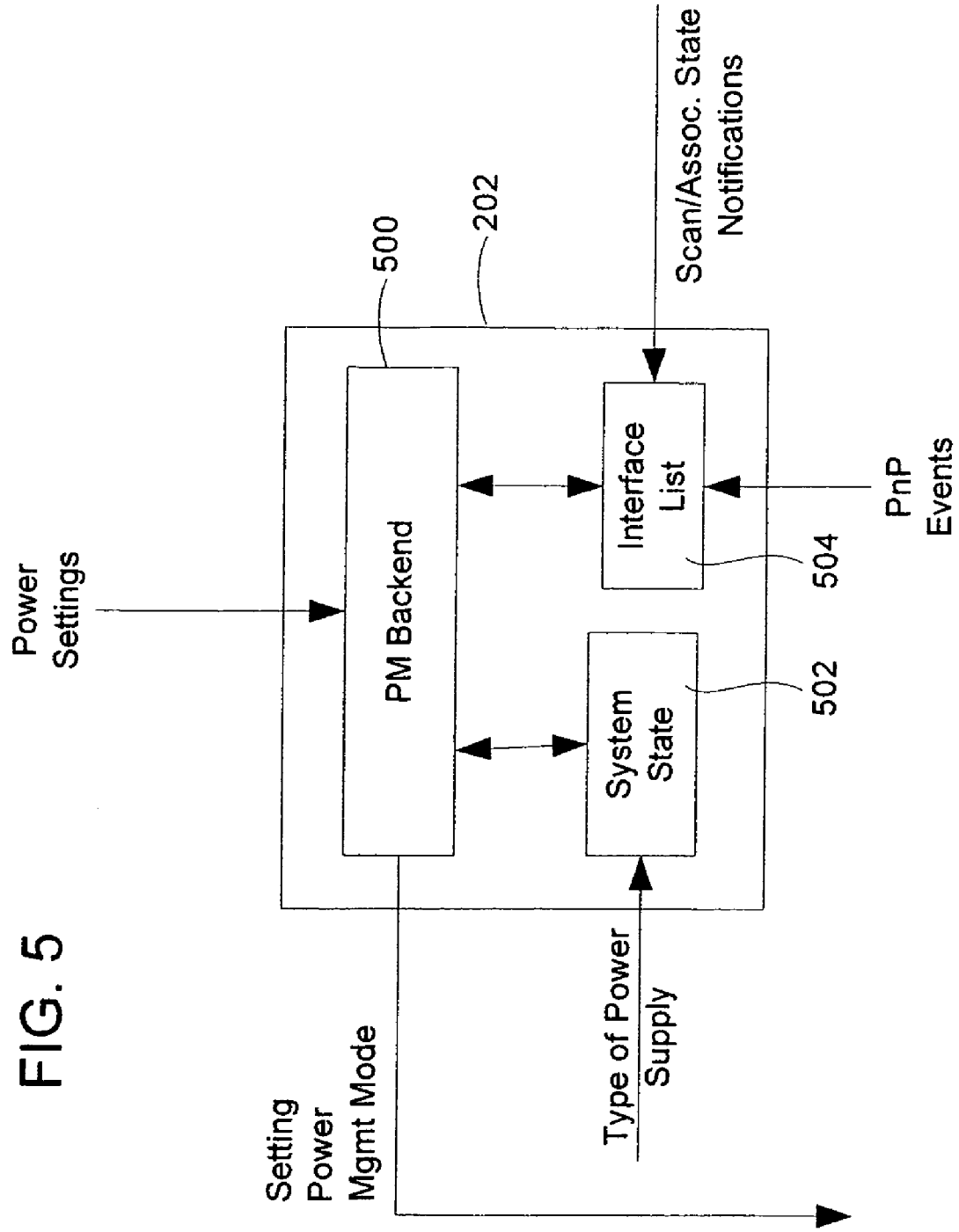
FIG. 5 is block diagram illustrating the power management module of the present invention.

Now that the overall operation has been described, the modules within the power management module 202 will be described. Turning now to FIG. 5, the power management module 202 has a power management backend 500, a system state module 502, and an interface list module 504. The power management backend 500 uses a state machine to manage the power state of the network interface module 201 based on the current state of the device 100. The state information includes global system state information from the system state module 502 and per-interface state information from the interface list module 504. The global system state information includes whether the device 100 is operating from the limited energy power source 120 or from an ac source. The per-interface state information includes whether the device 100 is associated on an interface, whether a scan is being requested, and plug and play events. The power setting 210 is also an input to the power management backend 500.

Figure 6:
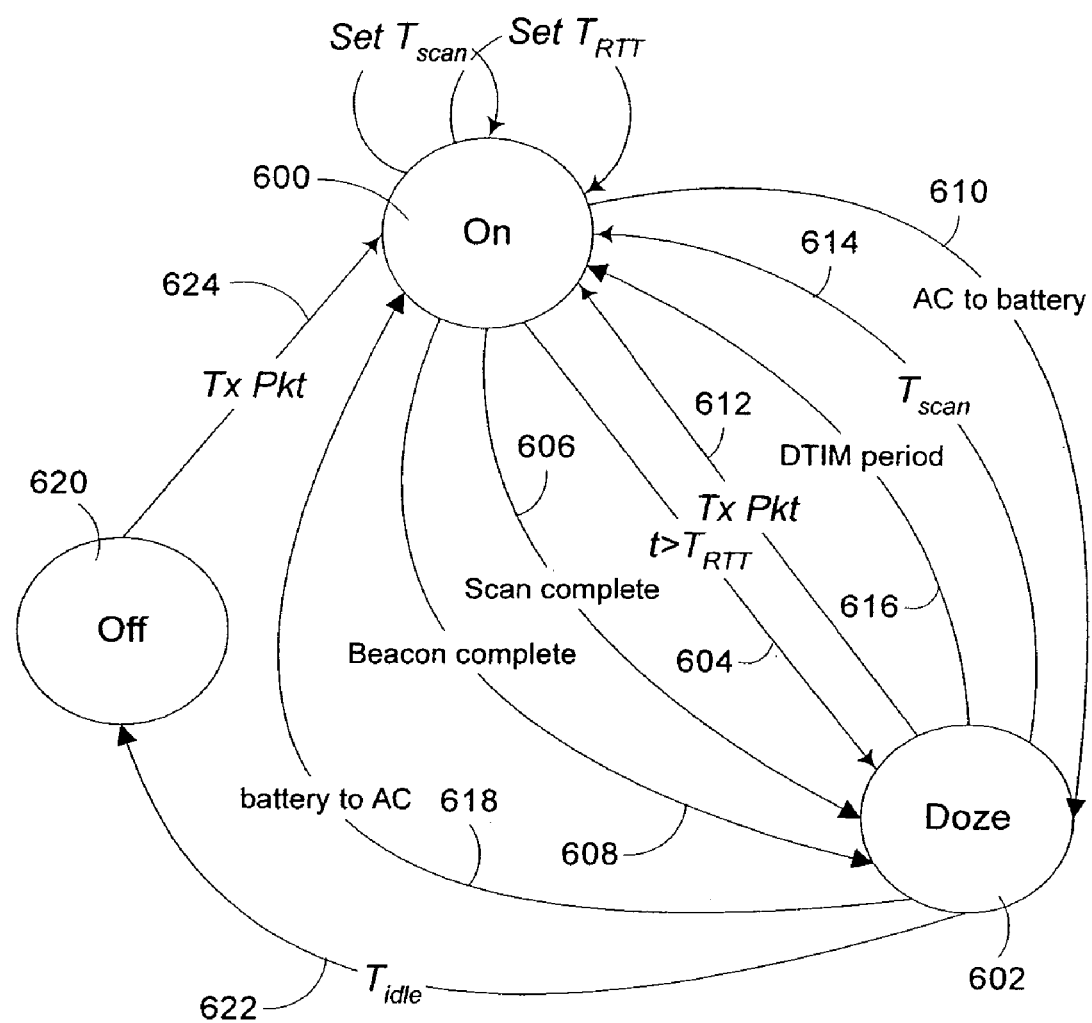
FIG. 6 is an illustration of a state machine used in the present invention.

The state machine is illustrated in FIG. 6. The power management module 201 will set the network interface module 201 to the doze state 602 from the on state 600 for several conditions. These conditions include when the delayed sleep timer since the last sent packet has expired (line 604). If the delayed sleep time is longer than a beacon interval, the network interface module 201 is set to the doze state 602. Other conditions are when a scan has been completed (line 606), when the network interface module 201 has woken up to receive a beacon and no traffic is waiting to be sent to the device 100 (line 608), and when the device 100 switches from a power line source to the limited energy power source 120 and no traffic is flowing (line 610).

The power management module 201 will set the network interface module 201 to the on state 600 from the doze state 602 for several conditions. These conditions include when the device 100 has a packet to transmit (line 612), when the network interface module 201 needs to scan for available networks (line 614), when the network interface module 201 needs to wake up to receive a beacon (line 616) and when the device 100 switches from limited energy power source 120 to ac power (line 618). If the device 100 is an energy compliant device or the like, the network interface module 201 remains in the doze state when the device 100 switches from limited energy power source 120 to ac power. The power management module 201 will set the network interface module 201 to the off state 620 from the doze state 602 if an idle timer has expired (line 622). The power management module 201 will set the network interface module 201 to the on state 600 from the off state 620 if the device 100 has a packet to send and the network interface module 201 was put in the off state (line 624).

Figure 7:
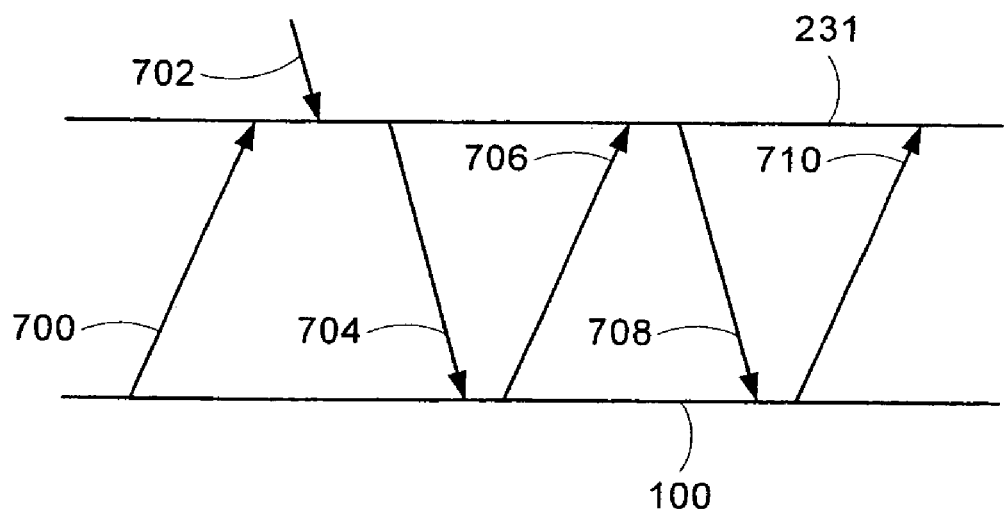
FIG. 7 is a line diagram illustrating a typical operation of a network interface module in a wireless network in accordance with the teaching of the present invention.

A typical operation scenario when the network interface module 201 is operating in the Max PSP or Fast PSP mode is illustrated in FIG. 7. When the device 100 is not sending or receiving packets, it enters the doze state after the delayed sleep time has passed. Before entering the doze state, a packet is sent to the access point 231 to indicate that the network interface module 201 in device 100 is entering the doze state (line 700). The access point 231 buffers packets (represented by line 702) destined for device 100 while the network interface module 201 is in the doze state. The access point 231 periodically sends beacons. As previously indicated, the beacon contains a traffic indication map that identifies which devices using power saving mode have data frames waiting for them in the access point's buffer. When the network interface module 201 is set to the on state to receive a beacon after a beacon interval has passed if the network interface module 201 is being operated in the Fast PSP mode (or in the case of Max PSP, after a listening interval has passed), it receives a beacon packet (line 704) and learns via the traffic indication map if at least one packet for the device 100 is buffered at the access point 231.

The network interface module 201 sends a message to the access point indicating that it is awake if the traffic indication map indicates a packet for the device 100 is buffered (line 706). After receiving the message, the access point 231 sends a buffered packet to the device 100 (line 708). If there is more packets queued in the buffers, the access point 231 provides an indication in the first packet sent and sends all the packets. The last packet to be sent has an indication that there is no more data in the access point's buffers for the device 100. After all of the packets have been received, a packet is sent to the access point 231 to indicate that the network interface module 201 is entering the doze state (line 710). The network interface module 201 will re-enter the doze only if it has no pending packets to be transmitted. If there are packets for transmission the network interface module 201 will first send all the pending packets and only after it has exhausted its transmit queues will it send an indication to the access point that it is entering the doze state. This takes care of the case where the network interface module 201 has queued packets to be transmitted to the access point or the peer while it was in the doze state. This process repeats itself for as long as the device 100 is associated with the access point 231. When sending a packet, the network interface module 201 sends the packet to the access point 231 for routing to the packet's destination and waits for the delayed sleep time to time out. After the delayed sleep time has passed, the network interface module 201 sends a message to the access point 231 that the module 201 is entering the doze state and then the module 201 enters the doze state.

Figure 8:
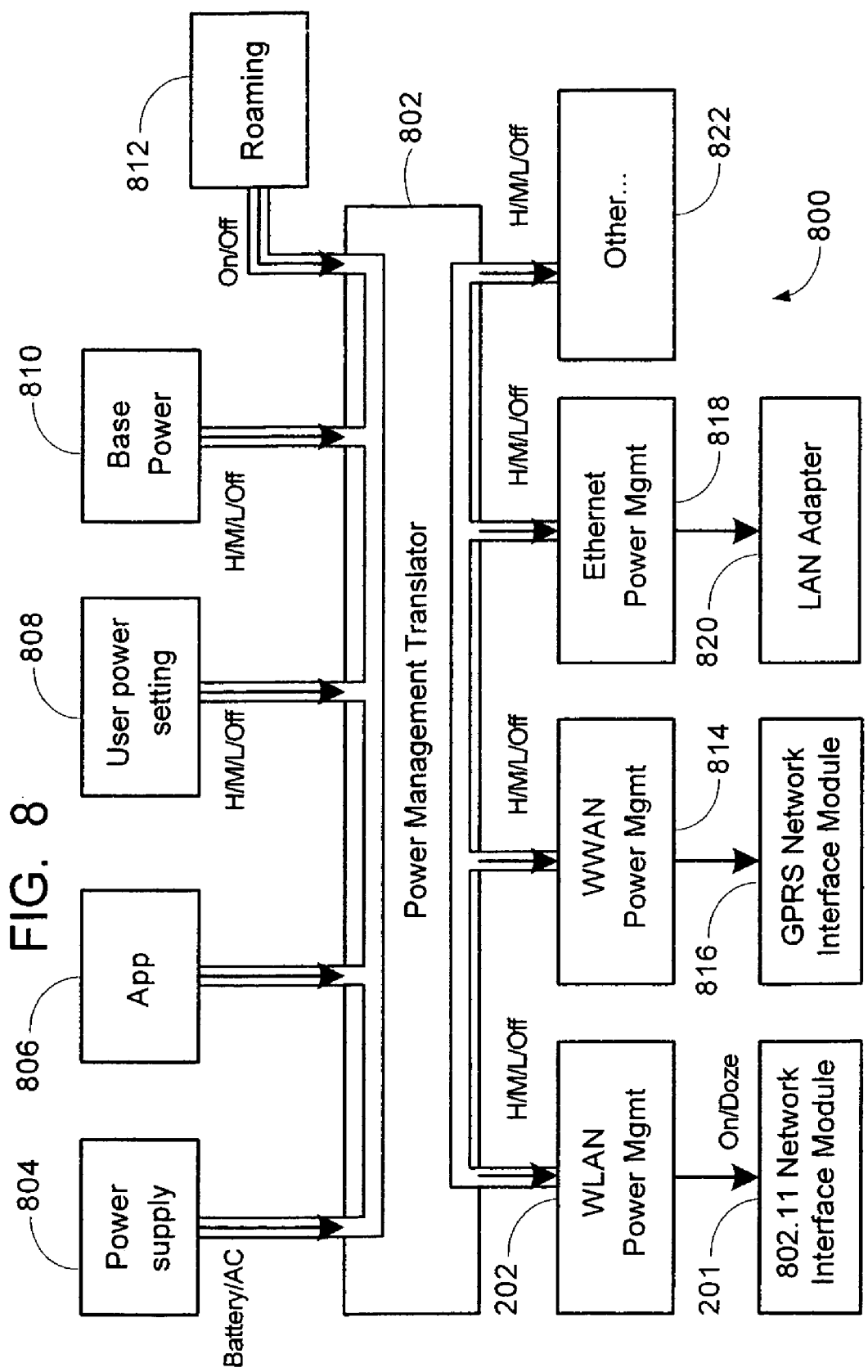
FIG. 8 is an illustration of an alternate embodiment of the power management module of the present invention.

Every network media type either does or could be required to implement power management. Turning now to FIG. 8, an alternate embodiment of the power management mechanism of the present invention is illustrated in an operating environment 800. In this embodiment, the power management module 802 receives commands from components that provide an input to the power management module 802 and that are not specific to a particular network. For purposes of explanation, these components will be called power setting components. The power management module 802 translates the commands and provides power settings to network adapter/interfaces. This allows the power setting components such as the power supply indicator, application programming interface, user power setting and the like to specify its power management requirement to the power management translator 802 without needing to specify their requirements to a specific network adapter. Each power setting component is also able to specify to which device the setting applies, if applicable. Components particular to a network, such as scanning engine 204, packet analyzer 212, and statistics analyzer 214 remain in a network specific power management module such as power management module 202 for 802.11 WLAN. Components particular to the GPRS (General Packet Radio Service) are in WWAN power management module 814, which controls the power level in the GPRS network interface module 816. Similarly, components particular to a LAN are in Ethernet power management module 818, which controls the power level in LAN adapter 820.

The operating system of the device 100 or another module (not shown) determines if power is being supplied by the limited energy power source 120 or from an ac source. It uses power supply indicator 804 to communicate to the power management translator 802 whether the device 100 is being supplied power by an ac source or from a limited energy power source. Applications use API 806 to request the data that it transmits must be transmitted in a low or high power state. If the application has no preferences, it does not call the API 806. The user may specify the power setting it wants through user power setting 808. These power settings are high, medium, low, or no power management. These power settings may be extended to additional settings for interface modules that provide more power settings. In one embodiment, when the device 100 is being supplied power from an ac source, the user settings are ignored. Additionally, if there is a real-time application actively engaged in a call and the user has specified high power management, the power management translator 802 temporarily overrides the user setting.

The base power setting 810 is used to instruct a power management module to shut a network interface module down if thermal conditions are exceeded or if the user has specified a global power setting. The roaming component 812 also has an impact on power management. If the 802.11 network interface module 201 is the active network connection, the power management translator 802 specifies to the other power management modules 814, 818, 822 that their network interface modules should be powered off. If two network interface modules are active at the same time (e.g. a LAN and a WLAN) then the power management translator 802 specifies a relevant power setting to both of them and specify that the other network interface modules should be powered off. Each power management component uses the power level setting provided by the power management translator 802 to determine the level of power management required for the particular network interface module the power management module is controlling.

The power management translator 802 has a system state module and an interface module. The system state module is in communication with the power supply indicator 804, API 806, user power setting 808, base power setting 810, and roaming component 812. The interface module communicates with power management modules 202, 814, 818, 822 and provides the desired power setting to the power management modules 202, 814, 818, 822 based on the inputs from the power supply indicator 804, API 806, user power setting 808, base power setting 810, and roaming component 812 as described above. Using the 802.11 power management module 202 as an example, the power management translator 802 sends the 802.11 power management module 202 a setting of H/M/L/Idle/Off (high power setting, medium power setting, low power setting, no power management, or off). The 802.11 power management module 202 translates this setting into the correct power state (On/Doze/Off) for the network interface module 202 and controls the network interface module based upon the operation parameters specific to the 802.11 network interface module 201. For example, if a low power setting is specified to power management module 202 from the power management translator, the power management module 202 sets the network interface module to the doze state for listening intervals as previously described (e.g., no scanning is being performed, the delayed sleep timer has timed out, etc.). Similarly, if the power management translator 802 provides a medium power setting to power management module 202, the power management module 202 sets the network interface module to the doze state for beacon intervals as previously described.

Power management modules for the other media types use the power setting provided by the power management translator 802 to use the appropriate power management setting for their network interface module. For example, wireless WAN might support more or less than three power settings, so the WWAN power management module 814 uses the power setting provided by the power management translator 802 to determine the correct power management setting for the GPRS network interface module 816. For example, power settings for a device in a GPRS network is idle or fully powered. When the device is transmitting or receiving call traffic, the device is fully powered. When the device is not in a call or is in a call and is not transmitting or receiving, the device is in a low power setting.

The power management translator 802 provides the ability to seamlessly add a new media type. A new media type registers with the power management translator 802 by calling an API and providing a globally unique identifier (GUID) and a friendly name. The power management translator 802 uses these to provide the generic setting to the power management module 822 of the network interface module for the media type. The power management translator 802 is not required to have knowledge of the functioning of the specific power management module 822. Similarly, the individual power management module 822 is not required to be aware of the power management requirements of the upper layer components 804 to 812 as these are translated into a single setting It can be seen that a method to conserve power has been presented by optimizing the power consumption of a network interface module of a computing device. While the description has been described in terms of time intervals that are used in 802.11 wireless networks, the method is useable in other types of wireless networks, including Bluetooth, GPRS, Hiperlan and other wireless LAN network types that use beacon intervals and the like and networks such as Ethernet LAN.

In view of the many possible embodiments to which the principles of this invention may be applied, it should be recognized that the embodiment described herein with respect to the drawing figures is meant to be illustrative only and should not be taken as limiting the scope of invention. For example, the power management module can also turn off the transmitter in wireless network interface modules that support this functionality. In this case, the network interface module (or power management module) may choose to keep the receive path powered-on while the transmit path is put into a lower power state. This mechanism could be used while the network interface module performs passive scans where it does not actively transmit probe requests (per IEEE 802.11 and the like), but rather passively gathers information regarding the networks around by receiving beacons and broadcast probe responses from nodes in the range of the network interface module. Those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to send packets in a device having a network interface module transmitting data packets from a plurality of sessions and operating in a power saving mode, the method comprising the steps of: sending a data packet to an access point that transmits beacons spaced by a beacon interval; estimating a round trip time for the packet; selecting a delay sleep time based on the estimated round trip time; when the delay sleep time is shorter than the beacon interval: setting a delay sleep timer to time out after the delay sleep time; sending a first message to the access point after the delay sleep timer has timed out to indicate the network interface module is entering a doze state in which a transmit and/or receive component of the network interface module is powered down; and setting the network interface module to the doze state in response to the delay sleep timer timing out; when the delay sleep time is longer than the beacon interval: sending a second message to the access point to indicate the network interface module is entering the doze state; and setting the network interface module to the doze state; and determining a maximum round trip transmission time for the plurality of sessions; and setting the delay sleep time to the maximum round trip time.

2. The method of claim 1 further comprising the step of resetting the delay sleep timer if at least one other data packet is being sent to the access point while the delay sleep timer is counting.

3. The method of claim 2 further comprising the step of determining the delay sleep time for each of the at least one other data packet.

4. The method of claim 3 wherein the step of setting the delay sleep time to the maximum round trip time comprises the steps of: setting the delay sleep time to the maximum round trip time if the estimated round trip time is lower than the beacon interval time; and setting the delay sleep time to a time less than the beacon interval time if the maximum round trip time is at least the beacon interval time.

5. The method of claim 1 wherein the step of setting the delay sleep timer to time out after the delay sleep time comprises determining the delay sleep time based at least in part on a session generating the packet.

6. A computer storage medium having computer-executable instructions for, when executed, controlling a wireless network-enabled computing device to perform steps comprising: sending packets associated with a plurality of sessions to an access point that transmits beacons spaced by a beacon interval; determining a maximum round trip transmission time for the plurality of sessions; selecting a delay sleep time based on the determined maximum round trip time; when the delay sleep time is shorter than the beacon interval: setting a delay sleep timer to time out after the delay sleep time; sending a first message to the access point after the delay sleep timer has timed out to indicate a network interface module is entering a doze state in which a transmit and/or receive component of the network interface module is powered down; and setting the network interface module to the doze state in response to the delay sleep timer timing out; and when the delay sleep time is longer than the beacon interval: sending a second message to the access point to indicate the network interface module is entering the doze state.

7. The computer storage medium of claim 6, wherein the computer-executable instructions, when executed, further control the wireless network-enabled computing device to perform steps comprising:

resetting the delay sleep timer if at least one other packet is being sent to the access point while the delay sleep timer is counting.

8. The computer storage medium of claim 6, wherein the steps of sending a packet, setting the delay sleep timer, sending the first message or the second message, and the setting the network interface module to the doze state occur while the wireless network-enabled computing device is associated with the access point.

9. A network interface module for a wireless network-enabled computing device, the wireless network-enabled computing device is adapted to transmit packets from a plurality of sessions, the module comprising: a transmit circuit adapted to send a packet to a second network enabled device with which the network enabled device is communicating; a packet analyzer adapted to determine a delay sleep time based on an estimated round trip time of the packet, the packet analyzer being adapted to determine the delay sleep time for each session; a power management module having a delay sleep timer, the power management module being adapted to: when the delay sleep time is shorter than a beacon interval: set the delay sleep timer to time out the delay sleep time after the packet is sent; send a message to the second network enabled device after the delay sleep timer has timed out, the message indicating that the network interface module is entering a doze state in which a transmit and/or receive component of the network interface module is powered down; and set the network interface module to the doze state in response to the delay sleep timer timing out; and when the delay sleep time is longer than the beacon interval: set the network interface module to the doze state until a subsequent beacon interval.

10. The network interface module of claim 9, wherein the power management module is further adapted to: reset the delay sleep timer if at least one other packet is being sent to the access point while the delay sleep timer is counting.

* * * * *